United States Patent [19]

Blackington

[11] 4,313,226

[45] Jan. 26, 1982

[54] FIBER OPTIC CONTROL APPARATUS

[75] Inventor: Paul A. Blackington, Afton, N.Y.

[73] Assignee: Sheltered Workshop for the Disabled, Inc., Binghamton, N.Y.

[21] Appl. No.: 126,178

[22] Filed: Mar. 3, 1980

[51] Int. Cl.³ .............................................. H04B 9/00
[52] U.S. Cl. .................. 455/603; 350/96.13; 350/96.14
[58] Field of Search ............... 350/96.13, 96.14; 455/603

[56] References Cited

U.S. PATENT DOCUMENTS

| | | | |
|---|---|---|---|
| 3,294,901 | 12/1966 | Stanghi | 455/603 |
| 3,842,403 | 10/1974 | Konopka | 455/603 |
| 4,023,887 | 5/1977 | Speers | 350/96.14 |
| 4,156,134 | 5/1979 | Minner | 455/603 |

*Primary Examiner*—Howard Britton
*Attorney, Agent, or Firm*—Richard G. Stephens

[57] ABSTRACT

Electro-optical apparatus for transmitting Boolean switching signals over substantial distances includes a transmitter having a light-emitting diode operable to apply light pulses at a line frequency rate (or double a line frequency rate) to an optic fiber. A remote receiver includes a photosensor for receiving light pulses from the optic fiber, means for amplifying signals from the photosensor, an opto-isolator comprising a light-emitter and a photo-thyristor operated by said light-emitter, an electronic switch connected to energize a load device, and means responsive to said photo-thyristor for controlling the electronic switch.

16 Claims, 9 Drawing Figures

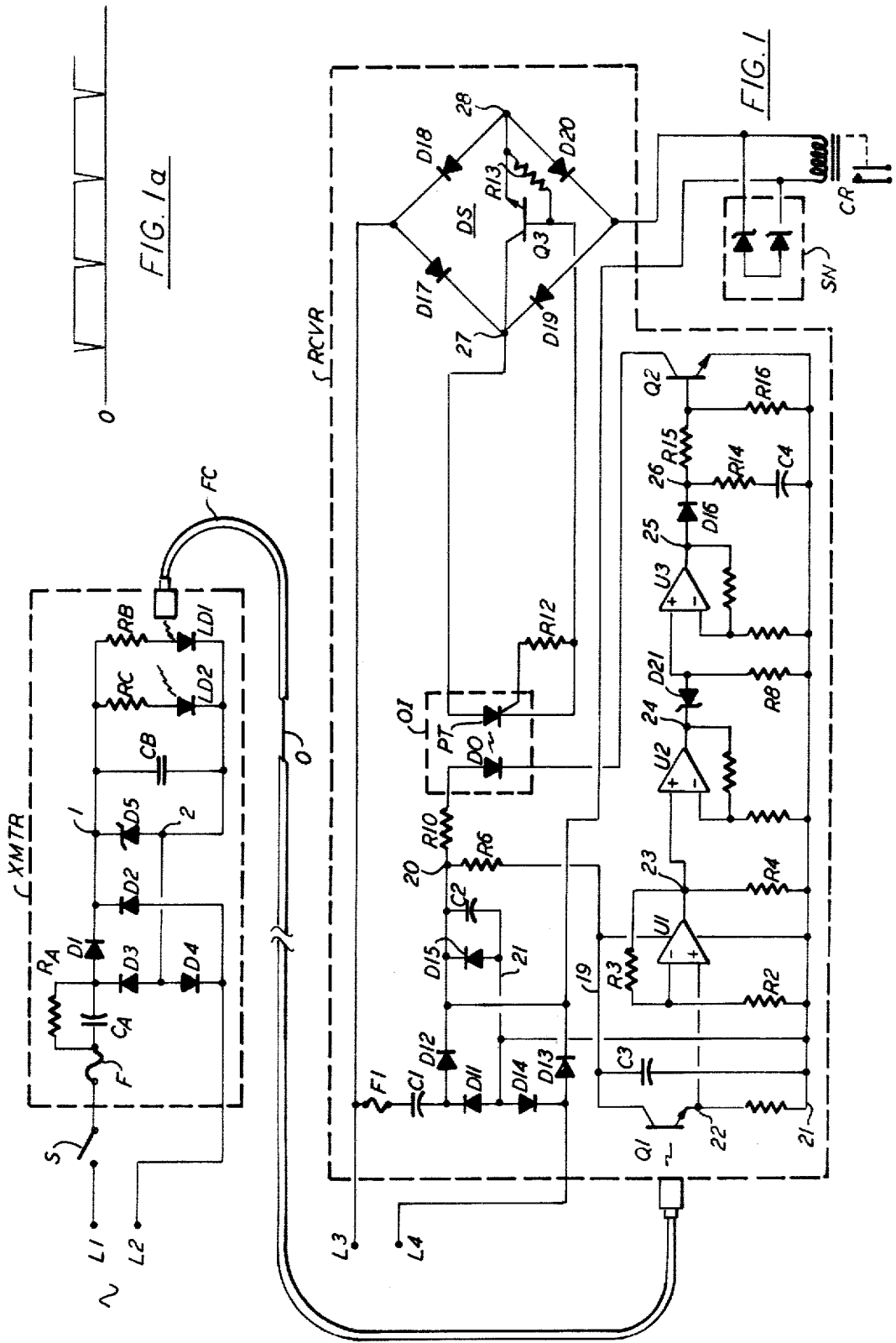

FIBER OPTIC CONTROL APPARATUS

This invention relates to electro-optical apparatus for transmitting switching control signals over substantial distances, and more particularly, to apparatus for transmitting Boolean or "on-off" control signals along an optical fiber.

The advent of inexpensive microprocessors and other electronic components has made it possible and desirable to provide much more automatic control, and much more complex automatic control, to many industrial plants and processes, and to various other systems, such as multi-story office buildings. The addition of desired types of automatic control frequently requires many added control circuits to route signals between sensors, controlled devices, such as motors and valves, and processor or like equipment. While sufficient numbers of signal circuits (such as twisted pairs) needed to properly interconnect such devices can be provided in new installations in a straightforward fashion, it would be prohibitively expensive to add such signal circuits in many existing installations. While it has been common practice for many years to provide some empty spare conduits in many installations to allow for future system expansion, many systems were installed with no idea that such extensive addition of control circuits would ever become desirable, so that their spare conduits are insufficient in size to accommodate a desired number of added signal circuits. In addition, spare conduits installed many years ago often do not extend to locations where added sensors, controlled elements or the like must be located. The installation of added conduits would be very expensive in some existing installations, and nearly impossible in others, due to space limitations, for example. One object of the present invention is to provide control signal transmission apparatus which will allow economical substantial expansion of automatic control of a system in which the electrical conduits and/or wiring ducts are already full, or nearly full.

Wholly aside from the aspect of system expansion, it has become increasingly desirable to locate numerous sensors and controlled elements in hazardous (e.g. combustible) environments. It has been the practice to house such devices in expensive "explosion-proof" housings, and to route the wiring for such devices through conduits using expensive "explosion-proof" fittings. Another object of the invention is to provide improved control signal transmission apparatus which does not require, or requires a minimum amount of, explosion-proof apparatus when used in a hazardous environment.

In accordance with one concept of the invention, an "on-off" control signal is routed from a transmitter to a receiver over an optical fiber in lieu of a wired electrical circuit. While wire circuits tend to present sparking and fire hazards and they often must be contained within metal conduits or ducts, optical fibers can be run outside such conduits or ducts without creating any sparking or fire hazard.

It has been known that analog voice signals or control information can be transmitted over an optical fiber link. For example, a voltage-controlled oscillator responsive to an analog input voltage may operate a light emitter to produce light pulses at a repetition rate or frequency deviation commensurate with an analog value for transmission of such pulses along an optical fiber, with a frequency sensitive circuit used at the receiving end of the cable to re-constitute the analog voltage. Such circuits tend to be complex and expensive, and tailor-made for a given application, with automatic gain control ordinarily being required. It also has been known that digital data pulses can be transmitted at very high rates over fiber optic circuits, either in the form of serially-coded pulse trains; or, when plural separate fibers are provided, in parallel digital code form. Such apparatus also tends to be complex and expensive, frequently requiring pulse re-shaping circuits at the receiving end. One important object of the present invention is to provide "on-off" or switching control signal transmission apparatus which is very economical to construct and install, and which is reliable in service. Another object of the invention is to provide economical signal transmission apparatus which has great versatility, so that a given form of the apparatus may be used in numerous different applications.

In accordance with one aspect of some forms of the invention, great economy is achieved by energizing a light emitter substantially directly from an alternating line voltage, to provide light pulses at the line frequency or double the line frequency, for example, without the need for any oscillator or added frequency generation device. It is generally deemed undesirable to transmit low-level control signal pulses over wired circuits at the line frequency or a low multiple thereof, since nearby magnetic or electric fields can introduce serious noise through inductive or capacitive coupling, but such fields cannot inject noise into an optical fiber, and hence transmission of pulses at the line frequency or double the line frequency proves to be completely practical.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a schematic diagram illustrating one form of the present invention.

FIG. 1a is a waveform useful in understanding operation of the apparatus of FIG. 1.

Figure 1B:
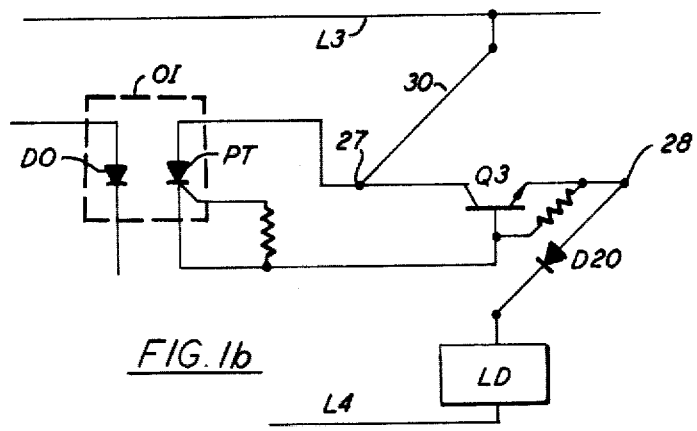
FIG. 1b is a schematic diagram illustrating one possible modification to the receiver apparatus of FIG. 1.

In FIG. 1 a switch S is closed to apply an alternating voltage from a conventional line source (e.g. 117 volts, 60 hertz) having terminals L1 and L2 to a transmitter shown within dashed lines at XMTR. The transmitter comprises a pulsating DC power supply section having a series fuse F, a voltage-dropping impedance formed by capacitor $C_A$ and resistor $R_A$ in parallel, a full-wave bridge rectifier formed by diodes D1 to D4, and a zener diode D5. The power supply section provides a pulsating DC voltage between terminals 1 and 2. The transmitter is shown as including a load which includes light-emitting diode LD1 in series with a resistor RB, and light-emitting diode LD2 in series with resistor RC.

Switch S may comprise a manually-controlled switch, but in many applications it will comprise a relay contact, an electronic (solid state) switch or some form of condition responsive switch, such as a pair of thermostat contacts, or a pressure-operated switch or the like. The two light-emitting diodes may comprise conventional LEDs which emit visible light, or if desired, LD1 may comprise a non-visible light emitter, such as an infra red emitting diode. LD2 and resistor RC may be omitted in various embodiments of the invention, as will be explained below.

Assume switch S is closed. During the half cycle of the line voltage when line terminal L1 is positive with respect to line terminal L2, current flows through fuse F, the voltage-dropping impedance, diode D1, zener diode D5 (and the load in parallel therewith), and diode D4 to line terminal L2. During the half cycle when terminal L2 is positive with respect to terminal L1, current flows through diode D2, zener diode D5 (and the load in parallel therewith), diode D3 and the voltage-dropping impedance to terminal L1. Zener diode D5 limits the voltage between terminals 1 and 2 to a peak value of about 5.1 volts, and that voltage varies as shown in FIG. 1a, comprising essentially a square wave voltage having brief notches occurring at a repetition rate of 120 per second (with a 60 hertz source).

Capacitor $C_A$, which typically might have a value of 4.0 microfarads, functions to limit the current applied to the bridge rectifier, thereby to control the current through zener diode D5 and the LEDs. Resistor RA, which typically may have a value of 100 kilo-ohms, insures that capacitor $C_A$ will discharge when switch S is open, so that a residual charge on capacitor $C_A$ cannot cause excessive current flow through zener D5 and the LEDs if the line voltage is high at the instant switch S closes.

The pulsating voltage between terminals 1 and 2 applied across the light-emitting diodes LD1 and LD2 and their associated current-limiting resistors R2 and R3 causes each light-emitting diode to emit pulses of light at twice the line frequency, with the intensity of light from these diodes varying with time in substantial conformance with the voltage variation shown in FIG. 1a. It may be noted that the pulsating DC voltage between terminals 1 and 2 is substantially unfiltered, and hence the LEDs are extinguished with no appreciable delay when switch S is opened. Further, the LEDs are illuminated with no appreciable delay when switch S is closed. In addition, avoiding substantial filtering in the transmitter allows it to be constructed physically very small. A small capacitor CB, which typically might comprise an 0.01 microfarad capacitor, theoretically could be said to provide some small amount of filtering, but its actual purpose is to merely smooth out small amounts of noise when the waveform (FIG. 1a) is near zero.

Light-emitting diode LD1 is located adjacent the end of a fiber optic cable FC to inject light pulses into the optical fiber O therein. The fiber O of cable FC may be fitted closely adjacent the light-emitting face of LD1 if the LD1 itself has no optical fiber attached thereto. Light-emitting diodes having short lengths of optical fiber attached to their faces are commercially-available, however, and if such a device is used, fiber O of the cable FC may be coupled to the end of the fiber extending from the light-emitting diode. Light-emitting diode LD2 is mounted in the transmitter to project light outside the housing of the transmitter to indicate that light pulses are being applied to cable FC. While the provision of LD2 is useful for testing and maintenance purposes, it and its associated resistor R3 manifestly may be omitted in some applications.

In one satisfactory embodiment of the invention cable FC comprised a silica fiber of 0.008 inch (0.2 mm.) diameter core covered with a protective covering having an outside diameter of 0.095 inch (2.4 mm.). Control signals were satisfactorily transmitted over lengths of such cable as great as 1200 feet (365.76 m.), and it will be apparent that signal transmission over distances up to that length is sufficient for a wide variety of control purposes. In FIG. 1 cable FC is shown leading to a receiver shown within dashed lines at RCVR. In some applications of the invention, however, light switches will be connected in the cable, as will be further explained below.

The receiver RCVR is shown connected to an alternating voltage source having terminals L3 and L4. In many applications of the invention the same source will be used at both transmitter and receiver, so that terminals L1 and L2 will correspond with L3 and L4. However, it is by no means necessary that the same source be available for use at both the transmitter and the receiver, and if two different sources are used, the phase angle between them is of no concern, nor need their voltages be the same.

During half-cycles when terminal L3 is positive with respect to terminal L4, current flows through fuse F1, capacitor C1, diode D12, zener diode D15 and load circuits in parallel therewith, through diode D14 to source terminal L4. During the other half cycle of the L3-L4 source line voltage, while source terminal L4 is positive with respect to terminal L3, current flows through diode D13, zener diode D15 and load circuits in parallel therewith, diode D11, capacitor C1 and fuse F1 to terminal L3. Thus diodes D11 to D14 comprise a full-wave rectifier. Zener diode D15 limits the voltage between terminals 20 and 21 to about 12 volts. Capacitor C2 is connected across diode D15 to provide substantial filtering. The 12-volt DC supply so formed furnishes power for transistors Q1,Q2, for operational amplifiers U1,U2 and U3, and for a light-emitting diode contained in opto-isolator OI. The DC voltage at terminal 20 is applied via resistor R6 to terminal 19, and capacitor C3 is connected between terminals 19 and 21, further filtering the DC supply voltage which powers the operational amplifiers and phototransistor Q1. The power supply connections to U2 and U3 are not shown, it being assumed that they are mounted on the same chip as amplifier U1.

Assuming that the transmitter XMTR is injecting light pulses into cable FC, pulses of light at the receiver end of the cable are applied to phototransistor Q1. In the absence of light pulses being applied to it, Q1 remains cutoff, and terminal 22 remains at the level of the negative (zero) terminal 21 of the 12-volt DC supply. As a pulse of light causes Q1 to conduct, the voltage at terminal 22 rises relative to that of terminal 21 in proportion to the conduction through Q1. The voltage developed across resistor R1 is directly coupled to the non-inverting input line of operational amplifier U1, which is connected as a non-inverting amplifier. Resistor R2 is an offset bias resistor, and resistor R3 is a feedback resistor, these resistors establishing the gain of amplifier U1. In a typical embodiment of the invention the voltage swing at terminal 22 is of the order of 0.5 to 20 millivolts, an U1 is arranged to provide a gain of 10, providing an output voltage swing at terminal 23 from zero to a voltage of the order of 5 to 200 millivolts, depending, of course, on the amount of light applied to Q1.

The voltage swing at terminal 23 is connected directly to the non-inverting input terminal of operational amplifier U2, which is also connected as a non-inverting amplifier, and provided with a gain of 450 in a typical application, providing an output voltage swing from zero to approximately 2.25 to 11.0 volts at terminal 24 in a typical application. Amplifier U2 is arranged to saturate at about 11 volts output. The signal swing at output terminal 24 of amplifier U2 is direct coupled to the non-inverting input terminal of operational amplifier U3, which is provided with a gain of 450 in a typical application, providing an output voltage swing from zero to approximately 11 volts at terminal 25 in a typical application. Amplifier U3 saturates as its output voltage closely approaches the supply voltage.

The voltage at terminal 25 is applied via diode D16 to charge capacitor C4 through resistor R14. When light pulses are applied to Q1, a voltage of 3.5 volts at terminal 25 will charge capacitor C4 up to that voltage less the forward drop (e.g. 0.7 volt) of diode D16, or to a voltage of 2.8 volts. In the case where very strong light pulses are received by Q1, an output voltage of 12 volts at terminal 25 will charge capacitor C4 to approximately 11.3 volts, and the voltage at terminal 26 approaches the output voltage of amplifier U3. During the brief instants once every 1/120th of a second between successive light pulses the voltage at terminal 25 will return to zero, cutting off diode D16, but leaving C4 charged. Whenever the voltage across capacitor C4 exceeds a predetermined level of the order of 0.7 volt, base-emitter current flow in transistor Q2 will cause that transistor to conduct, providing current flow through resistor R10 and the light-emitting DO diode of opto-isolator OI. The predetermined level of voltage in capacitor C4 at which Q2 is turned on is reached when the voltage at terminal 26 equals the Q2 base-emitter junction voltage (e.g. 0.7 volts) times (R15+R16)/R16. In a typical embodiment of the invention the values of R14,R15,R16 and C4 are 220 kilo-ohms, 5.6 kilo-ohms, 4.6 kilo-ohms, and 2.2 microfarads.

When the application of light pulses to phototransistor Q1 is terminated, so that voltage 25 drops to near zero and diode D16 is cutoff, capacitor C4 discharges through R14 and R15 and through R16 and the base-emitter circuit of Q2, with a time constant determined largely by the values of R14 and R15 and capacitor C4. Using the values given above the time constant is of the order of 20 milliseconds. It will be seen that the time required for Q2 to turn off after the cessation of light pulses depends upon the level to which C4 has charged and hence upon the intensity of the light pulses received at the receiver, but in any event the turn-off time is no more than about 25 milliseconds, which is quite fast enough for most applications.

If Q2 turns on when the voltage at terminal 26 reaches 1.0 volts, it will turn on when the voltage at terminal 25 reaches 1.7 volts. Thus it is important that drift or offset in amplifiers U1 to U3 be sufficiently small to insure that the voltage at terminal 25 never exceeds 0.7 volt when no light is applied to Q1. This is assured by use of low-drift operational amplifiers (e.g. Type LM 2902), particularly for amplifier U1, and properly matched offset resistances. Zener diode D21 also decreases the effect which offset voltage in amplifier U2 will cause at amplifier U3.

An output device typified by the coil CR of a relay is shown connected in series with a bridge DS between source terminals L3 and L4. Bridge DS comprises diodes D17 to D20. Bridge DS together with transistor Q3 comprise a known form of AC static switch. The collector-emitter circuit of transistor Q3 is connected between diagonally-opposite terminals 27 and 28 of the bridge. If transistor Q3 is cut off, current flow cannot occur in either direction through load device CR, because diode D19 is poled oppositely to diode D17, and diode D20 is poled oppositely to diode D18. If transistor Q3 is turned on, however, current will flow from L3 via D17,Q3,D20 and CR to L4 during one half-cycle, and current will flow in the opposite direction from L4 via CR, D19,Q3 and D18 to L3 during the other half-cycle. It will be seen that terminal 27 goes positive with respect to terminal 28 during both half-cycles, and that the photothyristor PT supplies equal base currents to Q3 during both half cycles. In the absence of current through the light emitting diode DO of opto isolator OI, the photothyristor PT of the opto isolator is cut off, no base current is applied to Q3, and hence no current flows through load device CR. When light pulses at the receiver turn on Q2 and cause the light-emitter of the opto isolator to emit light, that turns on the photothyristor, supplying base current to turn on Q3, and hence supplying current to load device CR. Opto isolator OI may comprise, for example, a Type No. 4N40 device commercially-available from General Electric Company, Syracuse, N.Y.

It may be noted that each of the diodes of bridge DS and transistor Q3 must be capable of carrying the full current supplied to the load device, which may be several amperes in various applications, but that the photothyristor and other portions of the receiver need only carry small currents. It is also necessary that transistor Q3 be capable of withstanding the peak value of line voltage when it is cut off. The load device CR may be resistive, or quite inductive as well as resistive, or even capacitive. The use of transistor Q3 in lieu of a thyristor insures load current flow during substantially all of both half-cycles even if the load is inductive. If the load is appreciably inductive, one form or another of many known types of snubber circuits should be used to limit overvoltage from the inductive field collapse when the load device is de-energized, and in FIG. 1 a pair of back-to-back zener diodes at SN are intended to represent one form of snubber circuit. Varistors may be used instead.

The load device CR in FIG. 1 represents a device intended to be supplied with alternating current, and if device CR comprises a conventional AC-operated relay or contactor coil, it may include a conventional shading turn or winding to minimize chatter. In some applications it is desired or required that relays or other load devices be supplied with direct current. It is a further feature of the invention that the receiver may be very readily modified to perform that function, by minor changes in its output circuitry. Indeed, one may construct the receiver so that either type of output circuitry may be plugged into the receiver. A modified form of output circuit shown in FIG. 1b provides half-wave rectified DC to a load LD. By comparison of FIG. 1b with FIG. 1 it can be seen that the device of FIG. 1 may be modified to the form of FIG. 1b by merely removing diodes D17,D18 and D19 and placing a jumper wire 30 between the terminals to which D17 was connected.

Figure 2A:
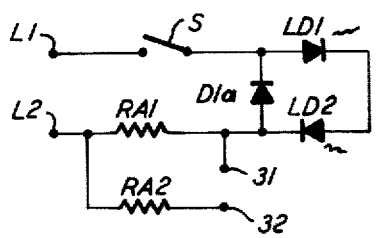
FIGS. 2a–2d are schematic diagrams illustrating various possible modifications to the transmitter portion of FIG. 1.
Figure 2B:
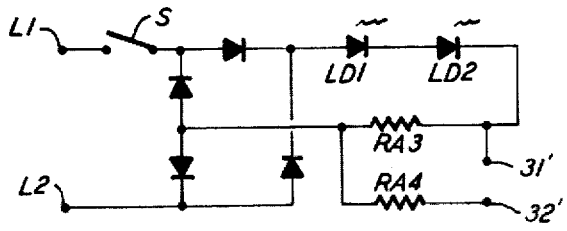

FIGS. 2a to 2d illustrate a variety of modifications which may be made in the transmitter. In FIG. 2a half-wave rectification is provided by diode D1a to provide 60 (for a 60 hertz line) pulses per second from the light-emitting diodes. The voltage across those diodes is not clipped as was done by zener diode D5 in FIG. 1, so diodes LD1 and LD2 in FIG. 2a provide light pulses of sinusoidally varying intensity. FIG. 2a also shows that the light-emitting diodes may be connected in series rather than in parallel and that they do not need individual current limiting resistors in series with them. Further, dropping of the line voltage to limit current through the light-emitting diodes can be done using resistance (RA1 or RA1 and RA2 in parallel) in lieu of using a capacitor. Resistance RA1 is used alone for 230-volt operation, while resistor RA2 is connected in parallel with resistor RA1 for 115-volt operation, by placing a jumper between terminals 31 and 32. FIG. 2b further illustrates that current limiting, if done by means of resistors, can follow rather than precede rectification.

Figure 2C:
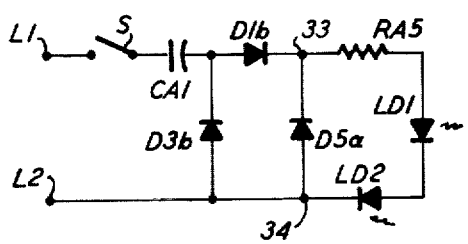

In the transmitter of FIG. 2c half-wave rectification is used to illuminate diodes LD1 and LD2 during half-cycles when line L1 is positive with respect to line L2. Capacitor CA1 and resistor RA5 both limit current through the LEDs. When source terminal L1 is positive and switch S is closed, current flows from L1 through switch S, capacitor CA1 and diode D1b, then branching into two paths across terminals 33 and 34, one path being through zener diode D5a and the other being through resistor RA5, light-emitting diodes LD1 and LD2. When source terminal L2 is positive, current flows through diode D3b, capacitor CA1 and switch S to terminal L1. Diode D3b allows capacitor CA1 to act as an AC impedance, and diode D5a limits the peak voltage across the RA5,LD1,LD2 network. Resistor RA5 controls the current flow through LD1 and LD2. This transmitter circuit furnishes pulses at a 60 hertz rate from a 60 hertz source, using a capacitive reactance for current limiting, minimizing heat dissipation and not requiring the use of a transformer.

Figure 2D:
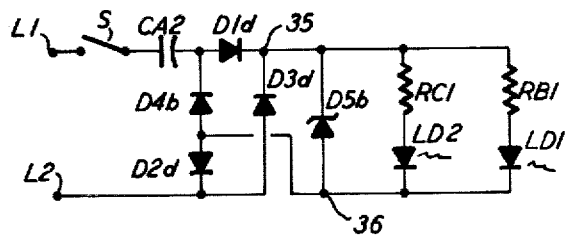

The transmitter circuit of FIG. 2d is arranged to furnish pulses at a 120 hertz rate from a 60 hertz source using capacitive reactance to minimize heat loss. When source terminal L1 is positive and switch S is closed current flows from L1, diode D1d, branching through three paths between terminals 35,36, and thence from terminal 36 to source terminal L2. When source terminal L2 is positive current flows from terminal L2 through diode D3d to terminal 35, through the same three paths to terminal 36, and thence through diode D4b, and capacitor CA2 to source terminal L1.

It will be apparent that a receiver constructed according to FIG. 1, or any of the various forms of transmitters shown, can be readily made to fit inside a standard 4×4×1.5 inch outlet box, for example.

Figure 3:
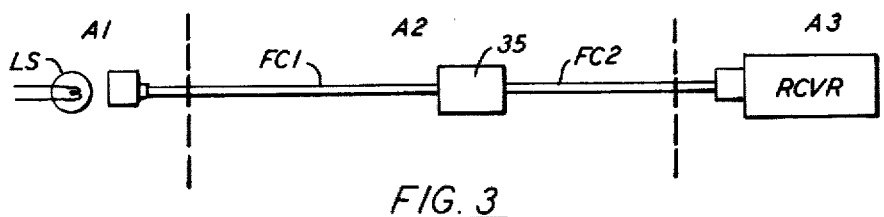
FIG. 3 is a diagrammatic view useful in understanding the use of a non-electrical or light switch according to the invention.
Figure 3A:
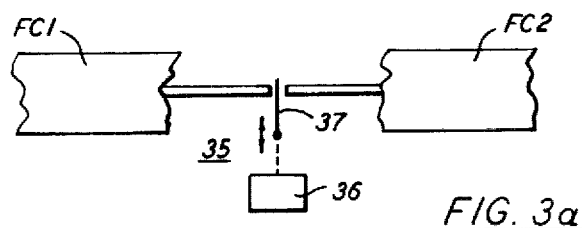
FIG. 3a is a schematic view illustrating principles of a portion of FIG. 3.

It sometimes is desirable that switching control signals emanate from devices located in dangerously-combustible atmospheres, or from devices which have no source of electrical power near them, and an added feature of the invention allows such operation. In FIG. 3 a light source LS, such as a simple incandescent lamp, located in an area $A_1$ which does not have a combustible atmosphere, applies steady (or pulsating) illumination to one end of an optic fiber cable FC1. Cable FC1 leads into an area $A_2$ having a combustible atmosphere, to a non-electrical switching device 35. A second optic fiber cable FC2 extends from device 35 outside area $A_2$ to a third area $A_3$ (or, if desired, back to area $A_1$) which has a combustible atmosphere, to a receiver RCVR, and a device it is desired to selectively control. As shown in FIG. 3a, switching device 35 comprises a transducer 36 which moves a shutter 37 in between the ends of the optical fibers in cables FC1 and FC2, either allowing or occluding passage of light from cable FC1 to cable FC2.

It should be recognized that while exemplary values of various components and voltage levels have been stated above in order to afford a clear understanding of the invention, that various changes in such values and levels will become apparent to those skilled in the art as a result of this disclosure.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Control signal transmission apparatus for energizing and de-energizing a load at a first location in response to operation of a switch at a second location, comprising, in combination: an optical fiber extending between said first and second locations; a transmitter located at said second location to be operated by said switch to selectively apply light pulses to said optical fiber; and a receiver located at first location and operable to energize said load in response to reception of light pulses from said optical fiber, said receiver comprising a photosensor operable to receive said light pulses from said optical fiber and to provide a first signal voltage, amplifier means for amplifying said signal voltage to provide a second signal voltage, an opto isolator comprising a light-emitter and a photothyristor operated by light from said light-emitter, means responsive to said second signal voltage for energizing said light emitter to turn on said photothyristor, an electronic switch connected in series with said load and including a transistor to open and close said electronic switch, said photothyristor being connected to control said transistor.

2. Apparatus according to claim 1 wherein said means for energizing said light emitter of said opto isolator comprises circuit means for peak-detecting said second signal voltage to provide a control voltage and a second transistor controlled by said control voltage.

3. Apparatus according to claim 1 wherein said transistor is connected to be powered by an alternating voltage source and comprises rectifier means and a light-emitting diode, said rectifier means being operable to apply direct current pulses to said light-emitting diode at a frequency which is an integral multiple of the frequency of said alternating voltage source.

4. Apparatus according to claim 1 wherein said receiver and said load are connected to be powered from first and second terminals of a source of alternating voltage, said receiver including rectifier means for rectifying said alternating voltage to apply a direct current supply voltage, said photo-transistor, said amplifier means, said light-emitter of said opto isolator and said means for energizing said light emitter being connected to be powered by said direct current supply voltage, and said load, said electronic switch and said photothyristor being connected to be powered by said alternating voltage.

5. Apparatus according to claim 1 wherein said electronic switch comprises a diode bridge having a first pair of terminals connected in series with said load and an alternating voltage source and having a second pair of terminals, said transistor being connected between said terminals of said second pair.

6. Apparatus according to claim 1 wherein said transmitter means is connected to be powered from an alternating voltage source and comprises an impedance and rectifier means connected in series across said alternating voltage source, and a light-emitting diode connected to receive rectified pulses from said rectifier means.

7. Apparatus according to claim 6 wherein said impedance comprises a capacitor.

8. Apparatus according to claim 6 wherein said transmitter includes a zener diode connected to limit the voltage applied to said light-emitting diode.

9. Receiver apparatus for energizing a load device upon receipt of recurrent light pulses at said receiver apparatus from an optic fiber, comprising, in combination: a first photosensor operable in response to said light pulses to provide first signals; amplifier means for amplifying said first signals; means for detecting output signals from said amplifier means to provide a control voltage; an opto-isolator having a light-emitter and a second photosensor turned on by light from said light-emitter; means for applying said control voltage to energize said light-emitter; and switching means controlled by said second photosensor for energizing said load device.

10. Apparatus according to claim 9 wherein said amplifier means comprises a plurality of cascaded direct-coupled amplifiers.

11. Apparatus according to claim 9 wherein said means for detecting comprises means for peak-detecting output signals from said amplifier means and a transistor responsive to detected signals for energizing said light-emitter of said opto isolator.

12. A control signal transmitter, comprising a light-emitting diode, rectifier means and an impedance connected in series with a switch across an alternating voltage source, and an optical fiber having one of its ends situated adjacent said light-emitting diode to receive pulses of light from said diode at a repetition rate corresponding to an integral multiple of the frequency of said alternating voltage source.

13. A transmitter according to claim 12 in which said rectifier means comprises a full-wave rectifier, whereby said repetition rate is twice said frequency.

14. A transmitter according to claim 12 in which said rectifier means comprises a half-wave rectifier, whereby said repetition rate equals said frequency.

15. A transmitter according to claim 12 wherein said impedance comprises a capacitor.

16. A transmitter according to claim 12 having a diode means for limiting the voltage applied across said light-emitting diode.

* * * * *